United States Patent Office 3,197,407
Patented July 27, 1965

3,197,407
STABILIZATION OF ORGANIC SUBSTANCES
Henryk A. Cyba, Chicago, Ill., assignor to Universal Oil Products Company, Des Plaines, Ill., a corporation of Delaware
No Drawing. Filed May 8, 1962, Ser. No. 193,337
9 Claims. (Cl. 252—46.6)

This is a continuation-in-part of my co-pending and now abandoned application Serial No. 174,710, filed February 21, 1962, which, in turn, is a continuation-in-part of now abandoned application Serial No. 836,084, filed August 26, 1959, and relates to the stabilization of organic substances by incorporating therein a novel composition of matter which serves to inhibit deterioration of the organic substance during storage, transportation and/or use.

The novel composition of matter of the present invention is selected from dithiophosphatyl thioepoxyalkane and dithiophosphatyl epoxyalkane and is represented by the following formulas:

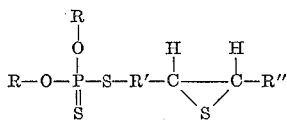

and

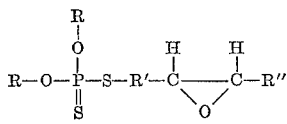

where R is hydrogen or a hydrocarbon group, R' is an alkylene group, and R" is hydrogen, a hydrocarbon group, or a dithiophosphatyl group.

In one embodiment of the invention, R is an alkyl group of 1 to 20 carbon atoms, R' is an alkylene group of 1 to 6 carbon atoms and R" is hydrogen, an alkyl group of 1 to 6 carbon atoms, or a dithiophosphatyl group. The thioepoxy or epoxy moiety is the sum of the carbon atoms in R' and R" and, accordingly, is from 3 to 14 carbon atoms. These compounds are named dialkyldithiophosphatyl thioepoxyalkanes and dialkyldithiophosphatyl epoxyalkanes.

The novel compounds of the present invention are readily prepared by the reaction of an alkali metal dithiophosphate and a haloepoxide in the presence of an oxygen-containing polar solvent. It is essential that the reaction be effected in the presence of the oxygen-containing polar solvent in order to form the novel compounds of the present invention by the inter-action of the alkali metal component of the dithiophosphate and the halogen of the haloepoxide. When using a non-polar solvent, entirely different reaction products are obtained, apparently constituting an addition type reaction in which both the alkali metal and the halogen are retained in the final product.

When reacting the alkali metal dithiophosphate with the haloepoxide, the dialkyldithiophosphatyl thioepoxyalkane and the dialkyldithiophosphatyl epoxyalkane are formed, the former generally predominating in the mixture of products. While not intending to be limited to the following explanation, applicant believes that decomposition of some of the dialkyldithiophosphate occurs under the reaction conditions to liberate sulfur which then replaces the oxygen in the epoxy group to form the thioepoxyalkane derivative. This accounts for the formation of the thioepoxyalkane derivative. However, as hereinbefore set forth, the final product also contains the epoxyalkane derivative.

For economic reasons, sodium or potassium is preferred as the alkali metal component, although it is understood that lithium, rubidium or cesium may be utilized in some cases. The reaction is readily effected by refluxing the alkali metal salt of the dithiophosphate and the haloepoxide in the presence of the oxygen-containing polar solvent.

In a preferred embodiment, epichlorohydrin is used as the haloepoxide and the resultant compounds will comprise those in which R' in the above general formula is a methylene radical and R" is hydrogen. When reacted with sodium or potassium dithiophosphoric acid, R in the above general formula is hydrogen and the resultant compounds are 1-S-dithiophosphatyl-2,3-thioepoxypropane and 1-S-dithiophosphatyl-2,3-epoxypropane. In a preferred embodiment, the dithiophosphatyl component preferably contains 1 or 2 alkyl groups, each containing from about 3 to about 20 carbon atoms. Illustrative compounds formed by the reaction of epichlorohydrin with such dialkyldithiophosphates include 1-S-(O,O-dimethyl dithiophosphatyl) 2,3-thioepoxypropane,
1-S-(O,O-dimethyl dithiophosphaty) 2,3-epoxypropane,
1-S-(O,O-diethyl dithiophosphatyl) 2,3-thioepoxypropane,
1-S-(O,O-diethyl dithiophosphatyl) 2,3-epoxypropane, and when used in lubricating oils, higher alkyl derivatives are preferred, such as 1-S-(O,O-dipropyl dithiophosphatyl) 2,3-thioepoxypropane,
1-S-(O,O-dipropyl dithiophosphatyl) 2,3-epoxypropane,
1-S-(O,O-dibutyl dithiophosphatyl) 2,3-thioepoxypropane,
1-S-(O,O-dibutyl dithiophosphatyl) 2,3-epoxypropane,
1-S-(O,O-diamyl dithiophosphatyl) 2,3-thioepoxypropane,
1-S-(O,O-diamyl dithiophosphatyl) 2,3-epoxypropane,
1-S-(O,O-dihexyl dithiophosphatyl) 2,3-thioepoxypropane
1-S-(O,O-dihexyl dithiophosphatyl) 2,3-epoxypropane,
1-S-(O,O-diheptyl dithiophosphatyl) 2,3-thioepoxypropane,
1-S-(O,O-diheptyl dithiophosphatyl) 2,3-epoxypropane,
1-S-(O,O-dioctyl dithiophosphatyl) 2,3-thioepoxypropane,
1-S-(O,O-dioctyl dithiophosphatyl) 2,3-epoxypropane,
1-S-(O,O-dinonyl dithiophosphatyl) 2,3-thioepoxypropane
1-S-(O,O-dinonyl dithiophosphatyl) 2,3-epoxypropane,
1-S-(O,O-didecyl dithiophosphatyl( 2,3-thioepoxypropane
1-S-(O,O-didecyl dithiophosphatyl) 2,3-epoxypropane,
1-S-(O,O-diundecyl dithiophosphatyl) 2,3-thioepoxypropane,
1-S-(O,O-diundecyl dithiophosphatyl) 2,3-epoxypropane,
1-S-(O,O-didodecyl dithiophosphatyl) 2,3-thioepoxypropane,
1-S-(O,O-didodecyl dithiophosphatyl) 2,3-epoxypropane,
1-S-(O,O-ditridecyl dithiophosphatyl) 2,3-thioepoxypropane,
1-S-(O,O-ditridecyl dithiophosphatyl) 2,3-epoxypropane,
1-S-(O,O-ditetradecyl dithiophosphatyl) 2,3-thioepoxypropane,
1-S-(O,O-ditetradecyl dithiophosphatyl) 2,3-epoxypropane
1-S-(O,O-dipenthadecyl dithiophosphatyl) 2,3-thioepoxypropane,
1-S-(O,O-dipentadecyl dithiophosphatyl) 2,3-epoxypropane,
1-S-(O,O-dihexadecyl dithiophosphatyl) 2,3-thioepoxypropane, 1-S-(O,O-dihexadecyl dithiophosphatyl) 2,3-epoxypropane,
1-S-(O,O-diheptadecyl dithiophosphatyl) 2,3-thioepoxypropane
1-S-(O,O-diheptadecyl dithiophosphatyl) 2,3-epoxypropane,
1-S-(O,D-dioctadecyl dithiophosphatyl) 2,-3-thioepoxypropane
1-S-(O,O-dioctadecyl dithiophosphatyl) 2,3-epoxypropane,
1-S-(O,O-dinonadecyl dithiophosphatyl) 2,3-thioepoxypropane,
1-S-(O,O-dinonadecyl dithiophosphatyl) 2,3-epoxypropane,
1-S-(O,O-dieicosyl dithiophosphatyl) 2,3-thioepoxypropane,
1-S-(O,O-dieicosyl dithiophosphatyl) 2,3-epoxypropane, etc.

Generally, the alkyl groups are the same as in the compounds specifically set forth above. In some cases the alkyl groups may be different as, for example, in compounds as 1-S-(O-propyl-O-amyl dithiophosphatyl) 2,3-thioepoxypropane,
1-S-(O-propyl-O-amyl dithiophosphatyl) 2,3-epoxypropane,
1-S-(O-amyl-O-tridecyl dithiophosphatyl) 2,3-thioepoxypropane,
1-S-(O-amyl-O-tridecyl dithiophosphatyl) 2,3-epoxypropane, etc.

Illustrative compounds in which a monoalkylphosphate is reacted with epichlorohydrin include 1-S-(O-propyl dithiophosphatyl) 2,3-thioepoxypropane,
1-S-(O-propyl dithiophosphatyl) 2,3-epoxypropane,
1-S-(O-butyl dithiophosphatyl) 2,3-thioepoxypropane,
1-S-(O-butyl dithiophosphatyl) 2,3-epoxypropane,
1-S-(O-amyl dithiophosphatyl) 2,3-thioepoxypropane,
1-S-(O-amyl dithiophosphatyl) 2,3-epoxypropane,
1-S-(O-hexyl dithiophosphatyl) 2,3-thioepoxypropane,
1-S-(O-hexyl dithiophosphatyl) 2,3-epoxypropane,
1-S-(O-heptyl dithiophosphatyl) 2,3-thioepoxypropane,
1-S-(O-heptyl dithiophosphatyl) 2,3-epoxypropane,
1-S-(O-octyl dithiophosphatyl) 2,3-thioepoxypropane,
1-S-(O-octyl dithiophosphatyl) 2,3-epoxypropane,
1-S-(O-nonyl dithiophosphatyl) 2,3-thioepoxypropane,
1-S-(O-nonyl dithiophosphatyl) 2,3-epoxypropane,
1-S-(O-decyl dithiophosphatyl, 2,3-thioepoxypropane,
1-S-(O-decyl dithiophosphatyl) 2,3-epoxypropane,
1-S-(O-undecyl dithiophosphatyl) 2,3-thioepoxypropane,
1-S-(O-undecyl dithiophosphatyl) 2,3-epoxypropane,
1-S-(O-dodecyl dithiophosphatyl) 2,3-thioepoxypropane,
1-S-(O-dodecyl dithiophosphatyl) 2,3-epoxypropane,
1-S-(O-tridecyl dithiophosphatyl) 2,3-thioepoxypropane,
1-S-(O-tridecyl dithiophosphatyl) 2,3-epoxypropane,
1-S-O-tetradecyl dithiophosphatyl) 2,3-thioepoxypropane,
1-S-(O-tetradecyl dithiophosphatyl) 2,3-epoxypropane, etc.

The alkyl group or groups may be straight or branched chain. It is understood that mixtures of the mono- and dialkyl substituted compounds may be employed. In some cases, mixtures of the mono- and dialkyldithiophosphates are available commercially, generally at a lower price, and such mixtures conveniently are used in preparing the novel compounds of the present invention.

Where R" in the above general formula is a dithiophosphatyl group, the compounds are produced by the reaction of a dihaloepoxide and alkali metal dithiophosphate. Illustrative compounds formed by the reaction of 1,4-dichloro-2,3-epoxybutane with dialkyl dithiophosphates are 1,4-bis-S-(O,O-dipropyl dithiophosphatyl) 2,3-thioepoxybutane,
1,4-bis-S-(O,O-dipropyl dithiophosphatyl) 2,3-epoxybutane,
1,4-bis-S-(O,O-dibutyl dithiophosphatyl) 2,3-thioepoxybutane,
1,4-bis-S-(O,O-dibutyl dithiophosphatyl) 2,3-epoxybutane,
1,4-bis-S-(O,O-diamyl dithiophosphatyl) 2,3-thioepoxybutane,
1,4-bis-S-(O,O-diamyl dithiophosphatyl) 2,3-epoxybutane,
1,4-bis-S-(O,O-dihexyl dithiophosphatyl) 2,3-thioepoxybutane,
1,4-bis-S-(O,O-dihexyl dithiophosphatyl) 2,3-epoxybutane,
1,4-bis-S-(O,O-diheptyl dithiophosphatyl) 2,3-thioepoxybutane,
1,4-bis-S-(O,O-diheptyl dithiophosphatyl) 2,3-epoxybutane,
1,4-bis-S-(O,O-dioctyl-dithiophosphatyl) 2,3-thioepoxybutane,
1,4-bis-S-(O,O-dioctyl dithiophosphatyl) 2,3-epoxybutane,
1,4-bis-S-(O,O-dinonyl dithiophosphatyl) 2,3-thioepoxybutane,
1,4-bis-S-(O,O-dinonyl dithiophosphatyl) 2,3-epoxybutane,
1,4-bis-S-(O,O-didecyl dithiophosphatyl) 2,3-thioepoxybutane,
1,4-bis-S-(O,O-didecyl dithiophosphatyl) 2,3-epoxybutane,
1,4-bis-S-(O,O-diundecyl dithiophosphatyl) 2,3-thioepoxybutane,
1,4-bis-S-(O,O-diundecyl dithiophosphatyl) 2,3-epoxybutane,
1,4-bis-S-(O,O-didodecyl dithiophosphatyl) 2,3-thioepoxybutane,
1,4-bis-S-(O,O-didodecyl dithiophosphatyl) 2,3-epoxybutane,
1,4-bis-S-(O,O-ditridecyl dithiophosphatyl) 2,3-thioepoxybutane,
1,4-bis-S-(O,O-ditridecyl dithiophosphatyl) 2,3-epoxybutane,
1,4-bis-S-(O,O-ditetradecyl dithiophosphatyl) 2,3-thioepoxybutane,
1,4-bis-S-(O,O-ditetradecyl dithiophosphatyl) 2,3-epoxybutane,
1,4-bis-S-(O,O-dipentadecyl dithiophosphatyl) 2,3-thioepoxybutane,
1,4-bis-S-(O,O-dipentadecyl dithiophosphatyl) 2,3-epoxybutane,
1,4-bis-S-(O,O-dihexadecyl dithiophosphatyl) 2,3-thioepoxybutane,
1,4-bis-S-(O,O-dihexadecyl dithiophosphatyl) 2,3-epoxybutane,
1,4-bis-S-(O,O-diheptadecyl dithiophosphatyl) 2,3-thioepoxybutane,
1,4-bis-S-(O,O-diheptadecyl dithiophosphatyl) 2,3-epoxybutane,
1,4-bis-S-(O,O-dioctadecyl dithiophosphatyl) 2,3-thioepoxybutane,
1,4-bis-S-(O,O-dioctadecyl dithiophosphatyl) 2,3-epoxybutane,
1,4-bis-S-(O,O-dinonadecyl dithiophosphatyl) 2,3-thioepoxybutane,
1,4-bis-S-(O,O-dinonadecyl-dithiophosphatyl) 2,3-epoxybutane,
1,4-bis-S-(O,O-dieicosyl dithiophosphatyl) 2,3-thioepoxybutane,
1,4-bis-S-(O,O-dieicosyl dithiophosphatyl) 2,3-epoxybutane, etc.

Here again, monoalkyldithiophosphates may be employed for reacting with 1,4-dichloro-2,3-epoxybutane. Also, the alkyl group or groups may be straight or branched chain.

It is understood that any suitable haloepoxy compound may be used for reacting with the alkali metal dithiophosphate. In general, the haloepoxy compound will contain from 3 to 6 or more carbon atoms. Illustrative chloro-substituted epoxides include epichlorohydrin, 1,2-epi - 4 - chlorobutane, 2,3 - epi - 4 - chlorobutane, 1,2-epi - 5 - chloropentane, 2,3 - epi - 5 - chloropentane, 1,2-epi - 6 - chlorohexane, 2,3 - epi - 6 - chlorohexane, etc. Dichloro substituted epoxides include 1,4-dichloro-2,3-epoxybutane, 1,5 - dichloro - 2,3 - epoxypentane, 1,6-dichloro - 2,3 - epoxyhexane, 1,6 - dichloro-3,4 - epoxyhexane, etc. The chloro substituted compounds generally are preferred, although the bromo substituted compounds may be used. In still other cases, the corresponding iodo or fluoro substituted compounds may be employed.

As hereinbefore set forth, the preferred compounds comprise those in which R in the above general formula is an alkyl group and, in one embodiment, R'' also is an alkyl group. In another embodiment R and/or R'' may be selected from other hydrocarbon groups including alkylene, aryl, alkaryl, aralkyl, cycloalkyl, etc. Illustrative examples of such compounds include 1-S-(O-heptadecenyl dithiophosphatyl) 2,3-thioepoxypropane,
1-S-(O-heptadecenyl dithiophosphatyl) 2,3-epoxypropane,
1-S-(O,O-dipentenyl dithiophosphatyl) 2,3-thioepoxypropane,
1-S-(O,O-dipentenyl dithiophosphatyl) 2,3-epoxypropane,
1,4-bis-S-(O-pentadecenyl dithiophosphatyl) 2,3-thioepoxybutane,
1,4-bis-S-(O-pentadecenyl dithiophosphatyl) 2,3-epoxybutane,
1,4-bis-S-(O,O-diheptenyl dithiophosphatyl) 2,3-thioepoxybutane,
1,4-bis-S-(O,O-diheptenyl dithiophosphatyl) 2,3-epoxybutane, etc.,
1-S-(O-phenyl dithiophosphatyl) 2,3-thioepoxybutane,
1-S-(O-phenyl dithiophosphatyl) 2,3-epoxybutane,
1-S-(O,O-diphenyl dithiophosphatyl) 2,3-thioepoxypropane,
1-S-(O,O-diphenyl dithiophosphatyl) 2,3-epoxypropane,
1,4-bis-S-(O-phenyl dithiophosphatyl) 2,3-thioepoxybutane,
1,4-bis-S-(O-phenyl dithiophosphatyl) 2,3-epoxybutane,
1,4-bis-S-(O,O-diphenyl dithiophosphatyl) 2,3-thioepoxybutane,
1,4-bis-S-(O,O-diphenyl dithiophosphatyl) 2,3-epoxybutane, etc.,
1-S-(O-xylyl dithiophosphatyl) 2,3-thioepoxypropane,
1-S-(O-xylyl dithiophosphatyl) 2,3-epoxypropane,
1-S-(O,O-ditolyl dithiophosphatyl) 2,3-thioepoxypropane,
1-S-(O,O-ditolyl dithiophosphatyl) 2,3-epoxypropane,
1,4-bis-S-(O-propylphenyl dithiophosphatyl) 2,3-thioepoxybutane,
1,4-bis-S-(O-propylphenyl dithiophosphatyl) 2,3-epoxybutane,
1,4-bis-S-(O,O-dixylyl dithiophosphatyl) 2,3-thioepoxybutane,
1,4-bis-S-(O,O-dixylyl dithiophosphatyl) 2,3-epoxybutane,
1,4-bis-S-(O-ethylphenyl dithiophosphtayl) 2,3-thioepoxybutane,
1,4-bis-S-(O-ethylphenyl dithiophosphatyl) 2,3-epoxybutane,
1,4-bis-S-(O,O-ditolyl dithiophosphatyl) 2,3-thioepoxybutane,
1,4-bis-S-(O,O-ditolyl dithiophosphatyl) 2,3-epoxybutane, etc.,
1-S-(O-phenbutyl dithiophosphatyl) 2,3-thioepoxypropane,
1-S-(O-phenbutyl dithiophosphatyl) 2,3-epoxypropane,
1-S-(O,O-diphenethyl dithiophosphatyl) 2,3-thioepoxypropane,
1-S-(O,O-diphenethyl dithiophosphatyl) 2,3-epoxypropane,
1,4-bis-S-(O-phenpropyl dithiophosphatyl) 2,3-thioepoxypropane,
1,4-bis-S-(O-phenpropyl dithiophosphatyl) 2,3-epoxypropane,
1,4-bis-S-(O,O-diphenethyl dithiophosphatyl) 2,3-thioepoxypropane, etc.,
1-S-(O-cyclohexyl dithiophosphatyl) 2,3-thioepoxypropane,
1-S-(O-cyclohexyl dithiophosphatyl) 2,3-epoxypropane,
1-S-(O,O-dicyclopentyl dithiophosphatyl) 2,3-thioepoxypropane,
1-S-(O,O-dicyclopentyl dithiophosphatyl) 2,3-epoxypropane,
1,4-bis-S-(O-cyclohexyl dithiophosphatyl) 2,3-thioepoxybutane,
1,4-bis-S-(O-cyclohexyl dithiophosphatyl) 2,3-epoxybutane,
1,4-bis-S-(O-dicyclohexyl dithiophosphatyl) 2,3-thioepoxybutane,
1,4-bis-S-(O-dicyclohexyl dithiophosphatyl) 2,3-epoxybutane, etc.

However, it is understood that the various compounds which may be prepared in accordance with the present invention are not necessarily equivalent in the utility thereof in particular applications.

As hereinbefore set forth, the novel compounds of the present invention are readily prepared by the reaction of an alkali metal dithiophosphate and a haloepoxide in the presence of the oxygen-containing polar solvent. When R'' in the above general formula is a hydrocarbon group, the phosphate and haloepoxide are reacted in equal mol proportions. When R'' in the above general formula is a dithiophosphatyl group, two mol proportions of the dithiophosphate are reacted with one mol proportion of the haloepoxide. The reaction is readily effected by refluxing the reactants for a time sufficient to accomplish the desired reaction. This may range from 0.5 to 48 hours or more and generally will be for a time of from about 3 to about 20 hours. The refluxing temperature generally will be within the range of from about 30° to about 150° C. and preferably about 50° to about 100° C. The pressure may range from atmospheric to 1000 p.s.i.g. or more.

As hereinbefore set forth, it is essential that the reaction is effected in the presence of an oxygen-containing polar solvent. Any suitable oxygen-containing polar solvent is employed including alcohols, particularly methanol, ethanol, propanol, butanol, etc., ketones including acetone, methyl ethyl ketone, diethyl ketone, dipropyl ketone, etc., and glycols, glycolethers, alkylamides, dimethylformamide, dimethylacetamide, nitromethane, dimethyl or diethyl sulfoxide, dimethyl ether, diethyl ether, etc. When desired, either or both of the reactants may be prepared as a solution in the solvent for ease of handling or in forming a more fluid reaction mixture, or the solvent may be added to the reaction mixture. The solvent permits effecting the reaction at lower temperature and thereby favors the formation of monomers. Polymers are formed at the higher temperatures. The polymers or polycondensates are not harmful in lubricating oils, but are undesirable in pesticidal and insecticidal formulations.

In one method of operation the haloepoxide and alkali metal dialkyldithiophosphate are formed as separate solutions in an alcoholic solvent. The solutions then are mixed, and the mixture is heated and maintained at refluxing conditions for the desired time. Following the completion of the reaction, the desired product is recovered in any suitable manner. In one method the product is dissolved in an aromatic solvent, washed with water and/or sodium bicarbonate or similar solution, dried over anhydrous sodium sulfate, anhydrous potassium carbonate or the like, and then filtered and heated to remove the aromatic solvent, the latter generally being effected under vacuum.

The compositions of this invention possess insecticidal properties with good inner-therapeutic action. They may be employed against many types of mites and insects such as, for example, Corausius larvae, Cotoneaster aphid, apple aphid, black bean aphid, aster aphid, green peach aphid, chrysanthemum aphid, pea aphid, etc. The compounds or mixture of these may be used for the control of various larvae, mites, eggs of mites and such insects as flour beetle, Mexican bean beetle, black carpet beetle, milkweed bug, German cockroaches, southern armyworms, mealy bug, sow bug, citrus red spider, greenhouse red spider, various mosquitoes, yellow fever mosquito, malarial mosquito, etc.

The novel composition of matter of the present invention is particularly useful as an additive to hydrocarbon oil and still more particularly to lubricating oil. In the latter oil, the compound serves a number of important functions such as oxidation inhibitor (peroxide decomposer), bearing corrosion inhibitor, ring anti-plugging additive, extreme pressure additive, pour point depressant, viscosity index improver, detergent, etc.

The lubricating oil may be straight mineral lubricating oil derived from paraffinic, naphthenic, asphaltic or mixed base petroleum crudes or blends thereof and is generally highly refined. In another embodiment the lubricating oil is a synthetic lubricating oil and may be one or a mixture of various types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di - 3,5,5 - trimethylpentyl glutarate, di - (2 - ethylhexyl) pimelate, di-(2-ethylhexyl) adipate, tri-amyl tricarballylate, pentaerythritol tetracaproate, dipropylene glycol dipelargonate, 1,5 - pentanediol - di - (2-ethylhexanonate), etc. The polyalkylene oxides and derivatives include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. Synthetic lubricants proposed for use in high temperature service as, for example, jet fuel lubrication are pentaerythritol esters and trimethylol propane esters.

The novel composition of the present invention also is useful as an additive to lubricating greases. These may be either of synthetic or petroleum origin. The synthetic greases generally are referred to as lithium base grease, sodium base grease, calcium base grease, barium base grease, strontium base grease, aluminum base grease, etc. These greases are solids or semi-solid gels and, in general, are prepared by the addition to mineral or synthetic lubricating oils of hydrocarbon-soluble metal soaps or salts of higher fatty acids as, for example, lithium stearate, calcium stearate, aluminum naphthenate, etc. The grease may contain thickening agents such as silica, carbon black polyacrylates, talc, etc. Another type of grease is prepared from oxidized petroleum wax, to which the saponifiable base is combined with the proper amount of the desired saponifying agent, and the resultant mixtures processed to produce a grease. Other types of greases in which the features of the present invention are usable include petroleum grease, whale grease, wool grease, etc., and those made from inedible fats, tallow, butcher's waste, etc.

The novel composition also is useful in the stabilization of polyolefins and particularly polyethylene. The polyolefins preferably are of high molecular weight, usually having a molecular weight above 1000 and extending into the hundreds of thousands range. Generally, these are synthetically prepared. A typical example is the widely used polyethylene plastics. Other polyolefins include polypropenes, polybutenes, and polymers of higher molecular weight olefins. These may be of the high density, medium density, or low density type. Polyethylene is utilized, for example, as thermoplastic molding or coating agent. Because of its high dielectric strength and its resistance to water, polyethylene is particularly advantageous for use as insulators or dielectrics in condensers and other similar electronic equipment. However, polyethylene is subject to attack by atmospheric oxygen, particularly at elevated temperatures, either in use or during manufacture, and this impairs the desirable properties thereof including, for example, a reduction in the desirable electric properties, gelation upon oxidation, etc.

Other organic substances which deteriorate in storage, during treatment, and/or in use, include hydrocarbons, and particularly motor fuels such as unsaturated gasoline, blends of unsaturated and saturated gasolines, etc., as well as jet fuel, diesel oil, mineral oil, fuel oil, residual oil, drying oil, waxes, resins, rubber, etc. These substances are adversely affected by oxygen, with the resultant formation of one or more of undesirable gum, sediment, discoloration, cracking, corrosion, and/or other deleterious reactions.

When used as an additive to organic substrates, the novel compounds of the present invention may be utilized in a concentration of from about 0.0001% to about 25% by weight of the organic substrate, although in some cases higher or lower concentrations may be employed. The exact concentration to be used will depend upon the particular substrate to be treated. In most cases concentrations from about 0.01% to about 2% by weight generally will be employed.

It is understood that the composition of the present invention may be used along with other additives incorporated in the organic substrate. For example, one or more of an additional additive including metal deactivator, dye, viscosity index improver, pour point depressant, antifoaming additive, lubricity and extreme pressure additive, anti-scuffing additive, detergent, corrosion inhibitor, etc., may be incorporated in the substrate. When desired, the composition of the present invention may be prepared as a mixture with one or more of these other additives and marketed and/or incorporated in the substrate in this manner. The composition of the present invention may be incorporated in the organic substrate in any suitable manner and at any suitable stage of preparation. When incorporated in a liquid substrate, the composition of matter is added thereto and intimately mixed by conventional means. When added to a solid or semi-solid substrate, the composition of the present invention preferably is added during the manufacture thereof in order to obtain intimate mixing. For example, in the manufacture of grease, the composition of the present invention may be added to one or more of the components of the grease prior to compositing and processing thereof, or it may be added to the mix at any time, preferably before final processing in order to obtain intimate mixing and dissolving thereof in the grease. In other cases, the solid substrate may be dipped, soaked or immersed in the additive, or the latter may be sprayed, brushed or otherwise applied to the solid substrate.

The following examples are introduced to illustrate further the novelty and utility of the present invention but not with the intention of unduly limiting the same.

EXAMPLE I

1-S-(O,O-diisopropyl dithiophosphatyl) 2,3-thioepoxypropane and 1-S-(O,O-diisopropyl dithiophosphatyl) 2,3-epoxypropane were prepared as follows: 126 g. of potassium diisopropyl dithiophosphate were dissolved in 200 g. of Formula 30 alcohol (90% ethanol-10% methanol). The solution was heated to refluxing temperature and 50.6 g. of epichlorohydrin were added drop-wise while mixing and refluxing for 14 hours. The product then was filtered to remove white crystalline potassium chloride, dissolved in benzene, washed with water, sodium bicarbonate solution, again with water, and finally dried over anhydrous potassium carbonate. The benzene was evaporated by heating on a steam bath under water pump vacuum. The product is a mixture of 1-S-(O,O-diisopropyl dithiophosphatyl) 2,3-thioepoxypropane and 1-S-(O,O-diisopropyl dithiophosphatyl) 2,3-epoxypropane and was recovered in a yield of 103 g. as a fluid light amber liquid, having a refractive index $n_D^{20}$ of 1.5180.

As hereinbefore set forth, the product is a mixture of the thioepoxypropane and epoxypropane derivatives. This was determined by sulfur and phosphorus analysis. The theoretical and actual percents sulfur and phosphorus for the above product are shown below, as well as the ratio of sulfur to phosphorus.

| | Percent Sulfur | | Percent Phosphorus | | Ratio S:P | |
|---|---|---|---|---|---|---|
| | Theory | Found | Theory | Found | Theory | Found |
| Thioepoxyalkane derivative | 33.5 | | 10.8 | | 3.1 | |
| | | 26.5 | | 9.30 | | 2.85 |
| Epoxyalkane derivative | 23.65 | | 11.45 | | 2.07 | |

From the above, it will be seen that the ratio of sulfur to phosphorus found is 2.85, which is in between the 3.1 and 2.07 ratios for the thioepoxyalkane and epoxyalkane derivatives. Accordingly, the product is a mixture of both of these derivatives. GLC (gas-liquid chromotographic) analysis of the crude product showed that 77% thereof was one compound, which, from the above data, indicates that it is 1-S-(O,O-diisopropyl dithiophosphatyl) 2,3-thioepoxypropane.

As hereinbefore set forth, the reaction involves the formation of potassium chloride. The above product also was analyzed for potassium and was found to contain only 0.012% by weight of potassium. In contrast, if the potassium were retained in the final product, the percent potassium would be of the order of 13.6% by weight. This further confirms the chemical formula of the product as hereinbefore set forth.

EXAMPLE II 1,4-bis-S-(O,O-diisopropyl dithiophosphaltyl) 2,3-thioepoxybutane and 1,4-bis-S-(O,O-diisopropyl dithiophosphatyl) 2,3-epoxybutane were prepared as follows: 138 g. (0.5 mol plus 12 g.) of potassium diisopropyl dithiophosphate were dissolved in 200 g. of refluxing methanol. 35.25 g. (0.25 mols) of 1,4-dichloro-2,3-epoxybutane were dissolved in 20 g. of methanol and the resultant solution was added drop-wise to the refluxing solution of potassium diisopropyl dithiophosphate. Refluxing was continued for six hours, after which the reaction mixture was allowed to cool, toluene solvent added and then washed three times with water, dried over anhydrous sodium sulfate, filtered, and the toluene removed by heating on a steam bath under water pump vacuum. The product is a mixture of 1,4-bis-S-(O,O-diisopropyl dithiophosphatyl) 2,3-thioepoxybutane and 1,4-bis-S-(O,O-diisopropyl dithiophosphatyl) 2,3-epoxybutane and was recovered in a yield of 87 g. as a reddish brown oily liquid, having an index of refraction $n_D^{20}$ 1.5278.

Here again, sulfur and phosphorus analyses indicate that the product predominates in 1,4-bis-S-(O,O-diisopropyl dithiophosphatyl) 2,3-thioepoxybutane and that the product also contains 1,4-bis-S-(O,O-diisopropyl dithiophosphatyl) 2,3-epoxybutane.

The product also was analyzed for potassium concentration and it was found to be only 0.016% by weight. Again, if potassium were retained in the final product, the percent potassium would be of the order of 13.6% by weight.

EXAMPLE III

The compounds prepared in Examples I and II were evaluated as additives to lubricating oil. These evaluations were conducted in a Lauson engine. In this series of tests, the runs were continued for 115 hours, using a jacket temperature of 210° F. and an oil temperature of 280° F. A typical commercial paraffinic-solvent extracted lubricating oil was used. Pertinent results of these runs are reported in the following table:

Table I

| Run Number | 1 | 2 | 3 |
|---|---|---|---|
| Additive | None | 0.5% by weight of Example I product | 0.5% by weight of Example II product |
| Bearing wt. loss, gms | 2.9021 | 0.0027 | 0.0049 |
| Oil ring plugging, percent | 5 | 0 | 0 |
| Oil consumption, ml./hr | 6.03 | 5.23 | 10.49 |
| Used Oil: | | | |
| Neutralization No | 10.78 | 0.87 | 0.68 |
| Saponification No., Mg.KOH/gm | 25.9 | 2.21 | 3.51 |
| Pentane insolubles, percent | 5.16 | 0.90 | 0.51 |
| Viscosity, SUS at | | | |
| 100° F | 742 | 388 | 377 |
| 210° F | 74.7 | 57.6 | 56.7 |

From the data in the above table, it will be noted that the novel compounds of the present invention were very effective in reducing corrosion, as evidenced by the very low bearing weight loss as compared to Run No. 1 made in the absence of the additive. Also, the compounds were effective in preventing undesired changes in the lubricating oil, as evidenced by the neutralization number, saponification number, percent pentane insolubles and viscosities.

EXAMPLE IV

1-S-(O,O-ditridecyl dithiophosphatyl) 2,3-thioepoxypropane and 1-S-(O,O-ditridecyl dithiophosphatyl) 2,3-epoxypropane were prepared as follows: 165 g. of ditridecyl dithiophosphate were reacted with 19.5 g. of potassium hydroxide dissolved in 200 g. of Formula 30 alcohol, following which 30 g. of epichlorohydrin were added dropwise, while refluxing for 13 hours. The reaction mixture was cooled, dissolved in benzene, washed twice with water, dried over anhydrous sodium sulfate, filtered and the benzene removed by distilling on a steam bath under vacuum. The product is a mixture of 1-S-(O,O-ditridecyl dithiophosphatyl) 2,3-thioepoxypropane and 1-S-(O,O-ditridecyl dithiophosphatyl) 2,3-epoxypropane and was recovered in a yield of greater than 170 g. as an amber colored liquid, having an index of refraction $n_D^{20}$ of 1.4885.

EXAMPLE V

1-S-(O-stearyl-O-2-ethylbutyl dithiophosphatyl) 2,3-thioepoxypropane and 1-S-(O-stearyl-O-2-ethylbutyl dithiophosphatyl) 2,3-epoxypropane were prepared by reacting 114.6 g. of O-stearyl-O-2-ethylbutyl dithiophosphoric acid with 8 g. of sodium hydroxide to form the sodium salt and then reacting the sodium salt with 18.5 g. of epichlorohydrin in the presence of 200 g. of methanol. The reaction mixture was refluxed for 3 hours. Sodium chloride was filtered off and the product worked-up in the manner hereinbefore described.

When evaluated in the Lauson engine as described in Example III, the oil containing one-half percent by weight of the above additive resulted in a bearing weight loss of 0.0625, 0% oil ring plugging and oil consumption of 5.97 ml./hr. All parts were free.

EXAMPLE VI

1-S-(O,O-diethyl dithiophosphatyl) 2,3-thioepoxypropane and 1-S-(O,O-diethyl dithiophosphatyl) 2,3-epoxypropane are prepared as follows: 98 g. of potassium diethyl dithiophosphate are dissolved in 200 g. of methanol. The solution is heated to refluxing temperature and 25 g. of epichlorohydrin are added drop-wise while mixing and refluxing for 10 hours. The product then is filtered to remove crystalline potassium chloride, dissolved in benzene, washed with water, dried over anhydrous sodium nitrate, and the benzene is evaporated on a steam bath under water vacuum. The product is recovered as a fluid light amber liquid.

EXAMPLE VII 1,4-bis - S - (O,O-diethyl dithiophosphatyl) 2,3-thioepoxybutane and 1-4-bis-S-(O,O-diethyl dithiophosphatyl) 2,3-epoxybutane are prepared as follows: 110 g. (0.5 mol plus 12 g.) of potassium diethyl dithiophosphate is dissolved in 200 g. of refluxing Formula 30 alcohol. 35.25 g. (0.25 mols) of 1,4-dichloro 2,3-epoxybutane are dissolved in 20 g. of Formula 30 alcohol and the resultant solution is added drop-wise to the refluxing solution of potassium diethyl dithiophosphate. Refluxing is continued for six hours, after which the mixture is filtered to remove crystalline potassium chloride, toluene solvent is added and then washed three times with water, dried over anhydrous sodium sulfate and the toluene removed by heating on a steam bath under water pump vacuum. The product is recovered as a reddish brown oily liquid.

EXAMPLE VIII

1-S-(O-heptadecenyl dithiophosphatyl) 2,3-thioepoxypropane and 1-S-(O-heptadecenyl dithiophosphatyl) 2,3-epoxypropane are prepared by reacting equal mol proportions of heptadecenyl dithiophosphate sodium salt with epichlorohydrin. Each of the reactants are formed as separate solutions in alcohol solvent. The dithiophosphate sodium salt solution is heated to refluxing temperature and the epichlorohydrin is gradually added thereto. The refluxing is continued for 8 hours, after which the reaction mixture is allowed to cool and the desired product recovered by washing, filtering and distillation under vacuum to remove entrained solvent.

EXAMPLE IX 1,4-bis-S-(O,O-ditolyl dithiophosphatyl) 2,3-thioepoxybutane and 1,4-bis-S-(O,O-ditolyl dithiophosphatyl) 2,3-epoxybutane are prepared by reacting 2 molar proportions of ditolyl dithiophosphate with 1 molar proportion of 1,4-dibromo-2,3-epoxybutane. The reaction is effected in substantially the same manner as hereinbefore set forth and the desired product is recovered by washing, filtering and vacuum distillation to remove entrained solvent.

EXAMPLE X 1,4-bis-S-(O,O-dicyclohexyl dithiophosphatyl) 2,3-thioepoxypentane and 1,4-bis-S-(O,O-dicyclohexyl dithiophosphatyl) 2,3-epoxypentane are prepared by reacting 2 molar proportions of dicyclohexyl dithiophosphate with 1 molar proportion of 1,5-dichloro-2,3-epoxypentane. The reaction is effected in substantially the same manner as hereinbefore set forth and the desired product is recovered by washing, filtering and distilling under vacuum to remove entrained solvent.

I claim as my invention:

1. Hydrocarbon material normally subject to oxidative deterioration containing, as an inhibitor therefor from about 0.0001% to about 25% by weight of an S-dithiophosphatyl compound selected from the group consisting of S-dithiophosphatyl thioepoxyalkane and S-dithiophosphatyl epoxyalkane.

2. Lubricating oil containing from about 0.0001% to about 25% by weight of an S-dithiophosphatyl compound selected from the group consisting of S-dithiophosphatyl thioepoxyalkane and S-dithiophosphatyl epoxyalkane.

3. Lubricating oil containing from about 0.0001% to about 25% by weight of 1-S-(O,O-dialkyl dithiophosphatyl) 2,3-thioepoxyalkane.

4. Lubricating oil containing from about 0.0001% to about 25% by weight of 1,4-bis-(O-alkyl dithiophosphatyl) 2,3-thioepoxyalkane.

5. Lubricating oil containing from about 0.0001% to about 25% by weight of 1-S-(O,O-dialkyl dithiophosphatyl) 2,3-epoxyalkane.

6. Lubricating oil containing from about 0.0001% to about 25% by weight of 1,4-bis-(O-alkyl dithiophosphatyl) 2,3-epoxyalkane.

7. Lubricating oil containing from about 0.0001% to about 25% by weight of 1-S-(O,O-ditridecyl dithiophosphatyl) 2,3-thioepoxypropane.

8. Grease containing from about 0.0001% to about 25% by weight of an S-dithiophosphatyl compound selected from the group consisting of S-dithiophosphatyl thioepoxyalkane and S - dithiophosphatyl epoxyalkane.

9. Polyolefin containing from about 0.0001% to about 25% by weight of an S-dithiophosphatyl compound selected from the group consisting of S-dithiophosphatyl thioepoxyalkane and S-dithiophosphatyl epoxyalkane.

References Cited by the Examiner

UNITED STATES PATENTS

| | | | |
|---|---|---|---|
| 2,565,920 | 8/51 | Hook et al. | 252—46.6 |
| 2,627,521 | 2/53 | Coover | 260—45.7 |
| 2,856,369 | 10/58 | Smith et al. | 252—46.6 X |
| 2,895,983 | 7/59 | Asseff | 252—46.6 X |
| 3,004,996 | 10/61 | Arakelian et al. | 252—46.6 |

FOREIGN PATENTS 1,082,915   6/60   Germany.

DANIEL E. WYMAN, *Primary Examiner.*